UNITED STATES PATENT OFFICE.

JOSEPH A. TATRO, OF HARTFORD, CONNECTICUT.

IMPROVEMENT IN PROCESSES OF TREATING PETROLEUM AND ITS PRODUCTS.

Specification forming part of Letters Patent No. 99,728, dated February 8, 1870; reissue No. 3,867, dated March 1, 1870; reissue No. 4,417, dated June 6, 1871.

I, JOSEPH A. TATRO, of Hartford, in the county of Hartford and State of Connecticut, have invented a process of converting petroleum, either crude or distilled, or the whole product arising from the distillation of crude petroleum, into a safe burning-oil, of which the following is a specification:

When crude petroleum is distilled in the common way the first product is gasoline; the second, benzole; the third, benzine; the fourth, a light oil; the fifth, the common burning-oil; then paraffine-oil; and last, a dark, heavy oil. The only one of these parts fit for burning in the family lamp is the fifth product just specified.

By my process I am enabled to take all the above products, mix them together, and make of the whole a safe and reliable oil. The difficulty to be overcome is to raise the fire-test—that is, the temperature at which flame will ignite the oil—to such a point as will make the oil safe for family use, and this I accomplish perfectly. The same process is applicable for the purpose of raising the fire-test of crude or distilled oil.

My process is as follows: Having distilled the crude oil and driven over everything that will go over in the worm of the still, and having, say, one hundred gallons of distillate, or the same quantity of crude or distilled oil, to operate on, take from one-fourth of one per centum of sulphuric acid (I have heretofore used acid of 66° gravity) to two per centum, the quantity being regulated as hereinafter shown, mix it with the distillate or oil, and agitate the whole most thoroughly. I have heretofore used a mechanical agitator made expressly for this purpose, and have found from five to ten minutes' agitation long enough to thoroughly mix the distillate or oil and the acid. Now add from four to eight per centum of dry-slaked lime, sprinkling it over the distillate or oil, and continue the agitation till the desired fire-test is reached. The quantity of lime is regulated as hereinafter shown. The fire-test can be raised to a perfectly safe degree almost anywhere from 110° to 160° Fahrenheit, and the longer the agitation the higher the fire-test. I have found from thirty to forty-five minutes long enough for this purpose.

Sulphuric acid may be used with phosphate of lime in the place of the slaked lime, if desired; but in this case it is better to mix the substances before putting them with the distillate or oil. The amount of sulphuric acid and of lime used is determined by the gravity of the distillate or oil, using the greater quantity for the lighter gravity. To commence with, the agitation must be perfect and thorough.

A fair average gravity for the oil or distillate to be operated on is from 43° to 53°, measured by any standard hydrometer. No crude oil, distilled oil, or distillate below 40° gravity is likely, in the present state of the art, to be used for the manufacture of burning-oil; neither is a crude oil, distilled oil, or distillate likely to be used of above 53° gravity, so that from 40° to 53° may be taken, practically, as the range of gravities in the oils or distillates required to be treated. Premising once more that the agitation is perfectly done, about one-fourth of one per centum of sulphuric acid will do for an oil or distillate of 40° gravity, and the percentage increases regularly as the gravity rises, till it will require about two per centum of acid for an oil or distillate of 53° gravity. As to lime, for an oil or distillate of 40° gravity about four per centum of lime will do, and the percentage increases with the rise in gravity, till about eight per cent. is needed for an oil or distillate of 53° gravity.

If it is required to treat an oil or distillate of a gravity below 40° or above 53° gravity the proportions given for the gravities between 40° and 53° will furnish the basis for calculating the amounts of acid and lime to be used.

In the original patent issued for this process, dated February 8, 1870, I disclaimed this process as applied to crude or distilled oil, acting under a mistake of my rights in the premises, and, as I have subsequently discovered my mistake, I hereby repudiate said disclaimer.

*Claim.*

I claim as my invention—

The process described of applying the said substances—sulphuric acid, dry lime, (or phosphate of lime,) or their chemical equivalents, in about the proportions specified—to crude petroleum-oil, to distilled oil, or to the whole product arising from the distillation of crude petroleum-oil, for the purpose set forth.

JOSEPH A. TATRO.

Witnesses:
WM. E. SIMONDS,
SARAH J. SIMONDS.